May 19, 1925.

R. D. BUELL

FLOW METER

Filed Feb. 15, 1921

1,538,164

Inventor
Roy D. Buell.
Emery, Booth, Janney & Varney
Attys.

Patented May 19, 1925.

1,538,164

UNITED STATES PATENT OFFICE.

ROY D. BUELL, OF CHICAGO, ILLINOIS.

FLOW METER.

Application filed February 15, 1921. Serial No. 445,077.

*To all whom it may concern:*

Be it known that ROY D. BUELL, a citizen of the United States, and a resident of the city of Chicago, county of Cook, and State of Illinois, has invented an Improvement in Flow Meters, of which the following is a specification.

This invention relates to meters and particularly to that class employed for indicating the running and operating conditions of motor vehicles.

More specifically, the invention relates to means for indicating the rate of fuel consumption and the distance of vehicle travel per unit of fuel consumption at various rates of speed.

Referring to the drawings.

Figure 1:
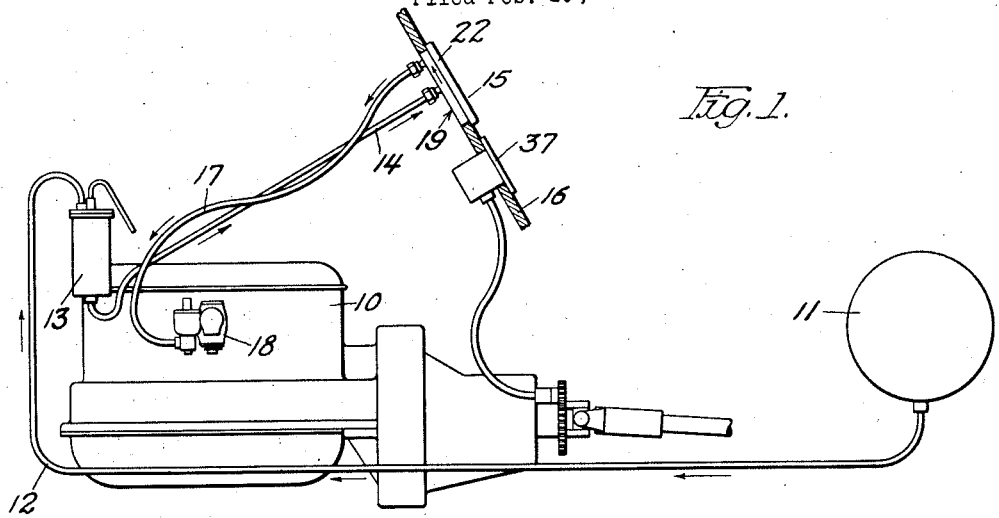
Fig. 1 is a view showing the application and arrangement of my illustrative device with respect to the fuel supply system of a motor vehicle.
Figure 2:
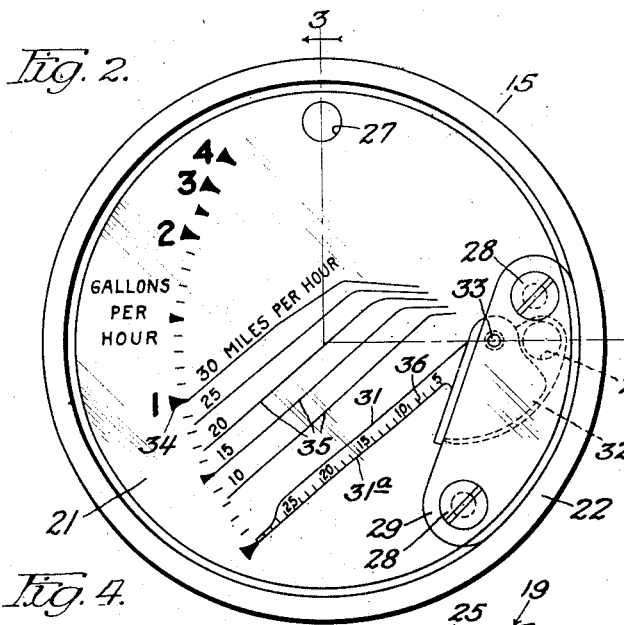
Fig. 2 is a face view of the illustrative device showing the arrangement and cooperation of the various indicating means and their respective graduated scales.
Figure 3:
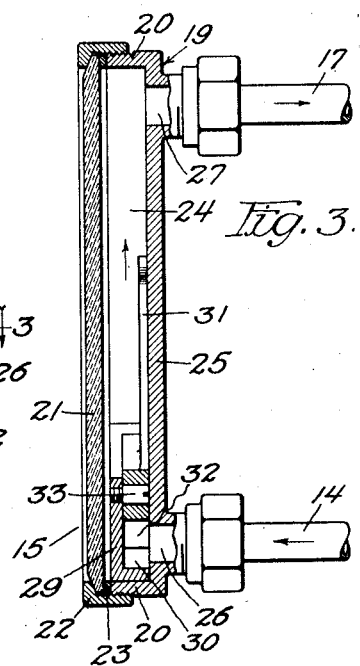
Fig. 3 is a sectional elevation taken on the line 3—3 of Fig. 2.

Referring to Fig. 1, in the illustrative arrangement, the fuel, such as gasoline or the like, is drawn by the suction of the motor 10 from a supply tank 11, through a pipe 12 into a vacuum tank 13, of ordinary type, through which it passes in the usual way.

From the vacuum tank, the fuel is drawn by siphon action through a pipe 14 into a meter 15 (mounted, preferably, on the instrument board 16 of a motor vehicle) and thence through a pipe 17 to the carburetor 18 and motor 10.

The meter 15 comprises the main body portion 19 of shallow cup-like form having side walls 20. Over the open side of the body portion is placed a glass or other transparent cover 21 adapted to be secured to the body portion by a clamping ring 22 screw threaded to receive the threads formed on the side walls 20, and, in conjunction with the gasket 23, forming a fluid tight chamber 24 through which the fuel passes from the supply tank to the carburetor and motor.

In the rear wall 25 of the body portion are formed inlet and outlet ports 26 and 27 respectively, the former communicating with the pipe 14 and the latter with the pipe 17.

Over the inlet port 26 and secured to the wall 25 by means of the screws 28 is a block 29 having its central portion cut away to form a chamber 30 to receive the fuel from the pipe 14.

To indicate the rate at which the fuel passes through the supply system, there is provided a fuel-flow indicator arm 31 suitably connected with an operating device responsive to fuel flow. For illustration, the indicator arm 31 is shown as mounted on a vane 32 (exemplifying a flow responsive element) the latter pivotally mounted on a pin 33 secured to the block 29 and interposed in the path of flow of the fuel to be moved thereby correspondingly with the rate of flow.

Figure 4:
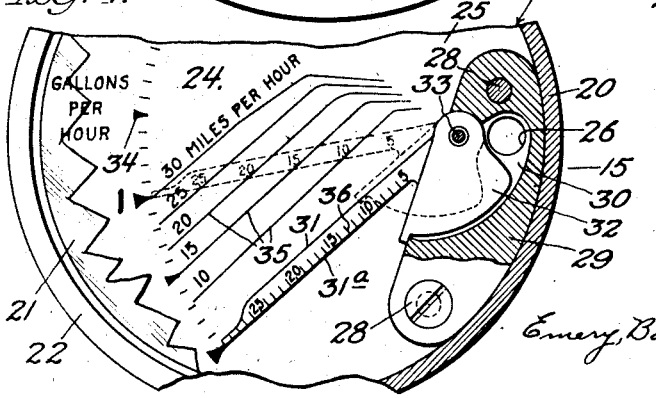
Fig. 4 is a fragmentary face view of the illustrative device showing the operation of the various indicating means.

The vane 32, when at rest, occupies a position indicated by full lines in Fig. 4 extending into the chamber 30 and forming, in effect, a movable obstruction in the path of the fuel, but when the motor is running, the flow of the fuel through the pipe 14, the inlet port 26, and chamber 30, to the outlet port 27, will cause the vane 32 and indicator arm 31 to swing about the pin 33 to a position corresponding to the flow of fuel through the system, for example, to that position indicated by dotted lines in Fig. 4.

A scale 34 is graduated in accordance with different positions of the indicator arm 31, corresponding to the different rates of flow of the fuel per unit of time. The dotted line position in Fig. 4 indicates fuel flow or consumption at the rate of one gallon per hour.

To show the travel of the vehicle per unit of fuel consumption, there are shown on the dial over which the indicator arm 31 passes, a number of curves 35 representing respective rates of vehicle travel (in the present instance, in miles per hour) while along the lower edge 31ᵃ of the arm 31 is a scale 36 graduated to cooperate with the said curves to indicate on said scale 36 the vehicle travel per unit of fuel consumption.

For example, assuming that the rate of fuel consumption is one gallon per hour, as indicated by the dotted line position of the arm 31 in Fig. 4, and that the speed of the vehicle as shown by the speedometer 37 (Fig. 1) is twenty miles per hour, the miles of vehicle travel per gallon of fuel consumed, will be indicated by the intersection of the curve for 20 miles per hour, with the scale 36 on the indicator arm 31; i. e., the instrument indicates 20 miles of travel per gallon of fuel consumed, as readable on the scale 36.

Thus, each curve representing the speed of the vehicle, cooperates with the scale 36 upon the arm 31, to indicate the distance of vehicle travel per gallon of fuel consumption.

Any suitable method may be employed in calibrating an instrument embodying features of this invention. For example, the scale 34 indicating "gallons per hour" may be laid out arbitrarily, and a standard shape and disposition for the vane 32 may be determined by sending through the instrument different measured flows of fuel, and so shaping and disposing the vane 32 that it will respond to those different flows, respectively, in such manner as to cause the index arm 31 to indicate them appropriately on the scale 34.

A scale having a suitable range may be laid out arbitrarily on the arm 31, after which the lines or curves for "miles per hour" may be plotted by using as a formula,—miles per hour divided by gallons per hour equals miles per gallon. For instance, to lay out the "30 miles per hour" curve, the arm 31 may be moved to indicate one gallon per hour, so that the formula will be 30 miles per hour divided by one gallon per hour equals 30 miles per gallon; therefore, since the scale 36 of the arm 31 is to indicate miles per gallon, the 30-graduation on the scale 36 will indicate a point on the 30-miles per hour curve.

To ascertain a second point for this same curve, the arm 31 may be moved to the "2 gallons per hour" graduation on the scale 34 so that the formula will be 30 miles per hour divided by 2 gallons per hour equals 15 miles per gallon. Thus when the arm 31 is in the position described, the 15-graduation on the scale 36 will indicate a second point in the "30 miles per hour" curve.

To ascertain a third point on the same curve, the arm 31 may be moved to the "3 gallons per hour" graduation on the scale 34 so that the formula will be 30 miles per hour divided by 3 gallons per hour equals 10 miles per gallon; and the 10-graduation on the scale 36 will indicate the third point in the "30 miles per hour" curve. Further or intermediate points on the same curve may be ascertained according to the same method.

Likewise the "25 miles per hour" curve may be plotted by moving the arm 31 to the "1 gallon per hour" graduation of the scale 34 so that the formula will be 25 miles per hour divided by 1 gallon per hour equals 25 miles per gallon; and the 25-graduation of the scale 36 will indicate a point on the "25-mile per hour" curve. The same method may be employed in laying out other points on that curve and the points for the other curves shown.

The method of calibration just explained is merely illustrative and those skilled in the art will perceive other methods which may be employed, starting for example, with other arbitrary graduations than those employed in the described method, and, from them, plotting the necessary supplemental graduations or curves.

Obviously, the present invention is not limited to the particular construction and arrangement shown in the illustrative device.

Furthermore, it is not indispensable that all the features of the invention be used conjointly since they may be used to advantage in various combinations and sub-combinations.

Having thus described my invention I claim:

1. The combination with a fuel supply system for the motor of a motor vehicle, of continuously operating fuel-flow indicating means; and stationary means representing various rates of vehicle speed and cooperable with said indicating means whereby the observer knowing the rate of speed of the vehicle, may ascertain the distance of vehicle travel per unit of fuel-flow.

2. The combination with a fuel supply system for the motor of a motor vehicle, of a fuel-flow indicator continuously responsive to fuel-flow; curves representing various rates of vehicle speed; and means associated with said indicator and cooperable with said curves whereby the observer, knowing the rate of speed of the vehicle, may ascertain the distance of vehicle travel per unit of fuel-flow.

3. The combination with a fuel supply system for the motor of a motor vehicle, of a stationary scale representing fuel consumption per unit of time; means representing various rates of vehicle speed; and an indicator arm responsive to fuel flow and cooperable with said scale and means whereby the observer, knowing the rate of speed of the vehicle, may ascertain simultaneously the rate of fuel consumption per unit of time and the distance of vehicle travel per unit of fuel consumption.

4. The combination with a fuel supply system for the motor of a motor vehicle, of a scale representing rate of fuel consumption; a plurality of curves representing various rates of vehicle speeds; and a fuel-flow actuated arm cooperable with said scale for indicating rate of fuel consumption and with said curves whereby the observer may ascertain the distance of vehicle travel per unit of fuel consumption at various known rates of vehicle speed.

5. The combination with a fuel supply system for the motor of a motor vehicle, of means for indicating rate of fuel consumption, said means comprising a scale and an indicator arm actuated by fuel-flow; curves representing various rates of vehicle speed per unit of time; and means associated with said arm and cooperable with said curves whereby the observer, knowing the rate of speed of the vehicle, may ascertain the distance of vehicle travel per unit of fuel consumption.

6. An indicator for motor vehicles comprising in combination, continuously operating fuel-flow, actuated means cooperable with a chart graduated to represent various rates of vehicle speed, for ascertaining distance of vehicle travel per unit of fuel consumption at various known rates of vehicle speed.

7. An indicator for motor vehicles comprising, in combination, a continuously operating fuel-flow actuated arm and a chart representing various rates of vehicle speed whereby the observer, knowing the rate of speed of the vehicle, may ascertain the distance of vehicle travel per unit of fuel consumption at the known rate of vehicle speed.

8. An indicator, in combination with the fuel supply system of a motor vehicle, comprising a fuel-flow actuated arm; a scale cooperable therewith for indicating rate of fuel consumption; and means representing various rates of vehicle speed and cooperable with said arm whereby the observer knowing the rate of speed of the vehicle, may observe the distance of vehicle travel per unit of fuel consumption.

9. An indicator, in combination with the fuel supply system of a motor vehicle, comprising a fuel-flow actuated arm; a scale representing gallons per hour and cooperable with said arm for indicating rate of fuel consumption; a series of graduations representing miles per gallon on said arm; a plurality of curves representing miles per hour and cooperable with said graduations for enabling the observer to ascertain the rate of vehicle travel per unit of fuel consumption at various known rates of vehicle speed.

In testimony whereof, I have signed my name to this specification.

ROY D. BUELL